US007146380B2

(12) United States Patent
Schaepe et al.

(10) Patent No.: US 7,146,380 B2
(45) Date of Patent: Dec. 5, 2006

(54) EXTRACTING INFORMATION FROM INPUT DATA USING A SEMANTIC COGNITION NETWORK

(75) Inventors: Arno Schaepe, Munich (DE); Maria Athelogou, Munich (DE); Ursula Benz, Alling (DE); Christof Krug, Munich (DE); Gerd Binning, Wollerau (CH)

(73) Assignee: Definiens AG, Munich (DE)

( * ) Notice: Subject to any disclaimer, the term of this patent is extended or adjusted under 35 U.S.C. 154(b) by 447 days.

(21) Appl. No.: 10/687,477

(22) Filed: Oct. 15, 2003

(65) Prior Publication Data
US 2004/0148296 A1    Jul. 29, 2004

(30) Foreign Application Priority Data
Oct. 15, 2002    (DE)    .................. 102 48 013

(51) Int. Cl.
*G06F 17/30*    (2006.01)
(52) U.S. Cl. ................... 707/103 X; 707/104.1
(58) Field of Classification Search ............. 706/45; 707/103 R–103 Z, 100, 104.1; 709/218
See application file for complete search history.

(56) References Cited

U.S. PATENT DOCUMENTS

| 5,671,353 | A | * | 9/1997 | Tian et al. .................... 714/48 |
| 5,778,378 | A | * | 7/1998 | Rubin .................... 707/103 R |
| 6,944,603 | B1 | * | 9/2005 | Bergan et al. ................ 706/45 |
| 2002/0188436 | A1 | | 12/2002 | Schmidt et al. ................ 704/1 |
| 2003/0115175 | A1 | * | 6/2003 | Baatz et al. ................... 707/1 |
| 2004/0006765 | A1 | * | 1/2004 | Goldman .................... 717/116 |

FOREIGN PATENT DOCUMENTS

| DE | 199 08204 A1 | 10/1998 |
| WO | WO 01/45033 A2 | 12/1999 |

OTHER PUBLICATIONS

Schaepe, Urbani, Leiderer and Athelogou, "Fraktal hierarchische, prozess- und objektbasierte Bildanalyse. Anwendung in der biomedizinischen Mikroskopie," Bildverarbeitung fuer die Medizin, Mar. 9, 2003, pp. 206-210, XP002282616.

* cited by examiner

*Primary Examiner*—John R. Cottingham
*Assistant Examiner*—Cheryl Lewis
(74) *Attorney, Agent, or Firm*—Silicon Edge Law Group LLP; Darien K. Wallace

(57) ABSTRACT

A method is disclosed for extracting information from input data comprising mapping of the input data into a data object network. The method uses a semantic cognition network comprised of the data object network, a class object network and a processing object network. The semantic cognition network uses a set of algorithms to process the semantic units. The semantic cognition network defines a processing object in the processing object network by selecting a data domain in the data object network, a class domain in the class object network and an algorithm from the set of algorithms. The processing object comprises the data domain, the class domain and the algorithm. The processing object is used in the processing object network to process the semantic units.

32 Claims, 7 Drawing Sheets

EXTRACTING INFORMATION FROM INPUT DATA USING A SEMANTIC COGNITION NETWORK

CROSS REFERENCE TO RELATED APPLICATION

This application is based on and hereby claims the benefit under 35 U.S.C. §119 from German Application No. 102 48 013.3, filed on Oct. 15, 2002, in Germany, the contents of which are incorporated herein by reference. This application is a continuation of German Application No. 102 48 013.3.

TECHNICAL FIELD

The present invention relates generally to computer-implemented methods for extracting information from input data and, more specifically, to such methods employing semantic cognition networks.

BACKGROUND

There are known semantic networks which are formalisms for knowledge representation in the field of artificial intelligence. A semantic network consists of semantic units and linking objects. The linking objects link respective semantic units and define the type of the link between the respective semantic units. However, it is not possible to expand, delete or amend the knowledge which is present in the semantic units and the linking objects of the semantic network.

From WO 01/45033 A1 there is known a computer-implemented method for processing data structures using a semantic network. Processing objects comprising algorithms and execution controls act on semantic units to which there is a link. Processing objects can be linked to a class object to thereby be able to perform local adaptive processing. The processing objects can use a plurality of algorithms.

According to the aforementioned document there is used a new approach for object-oriented data analysis and especially picture analysis. The main difference of this method is that compared with pixel-oriented picture analysis classification of object primitives is performed. These object primitives are generated during segmentation of the picture. For this purpose a so-called multi-resolution segmentation can be performed. The multi-resolution segmentation allows for segmentation of a picture in a network of homogenous picture region in each resolution selected by a user. The object primitives represent picture information in an abstract form.

As classified information carriers within a picture object network such object primitives and also other picture objects derived from such object primitives offer several advantages as compared to classified pixel.

In general the semantic network comprises two essential components. The first one is a data object network such as a picture object network and the second one is a class object network. Beside the multi-resolution segmentation there is also the possibility of performing a so-called classification-based segmentation.

As mentioned above, the processing objects can be linked to class objects and therefore knowledge which is present in the semantic network can be expanded, deleted or amended by using the processing objects.

However, there exist several problems. The processing objects perform a local adaptive processing in the semantic network. The important aspects of local adaptive processing are analyzing and modifying objects but also navigating through the semantic network according to linking objects. However, the aspect of navigating is not covered by the aforementioned method.

SUMMARY

In one embodiment, a method extracts information from input data by mapping the input data into a data object network. The input data is represented by semantic units. The method uses a semantic cognition network comprised of the data object network, a class object network and a processing object network. The semantic cognition network uses a set of algorithms to process the semantic units. The semantic cognition network defines a processing object in the processing object network by selecting a data domain in the data object network, a class domain in the class object network and an algorithm from the set of algorithms. The processing object comprises the data domain, the class domain and the algorithm. The processing object is used in the processing object network to process the semantic units.

In another embodiment, a system extracts information from input data using a semantic cognition network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Both a computer-implemented method and a system are disclosed for extracting information from input data. The system can be implemented both on a single computer and on a distributed network of computers such as a local area network (LAN) or a wide area network (WAN). The constituents of a semantic cognition network, also simply called a semantic network, may be implemented in both a centralized and a decentralized form of a WAN. As the structure of distributed networks of computers upon which the system is implemented is commonly known in the art, a detailed description of such distributed networks of computers is omitted here.

In the exemplary embodiment described below, a system is described that processes image data. In other embodiments, however, other types of data are processed. For example, other embodiments process data structures provided in a topological context. In addition, yet other embodiments can process data structures in the form of audio data, text data or statistically acquired data (data mining).

With regard to the terms "semantic network", "semantic unit", "linking object" and "processing object" as used in this application reference is made to WO 01/45033 A1 which is fully incorporated herein by reference.

Figure 1:
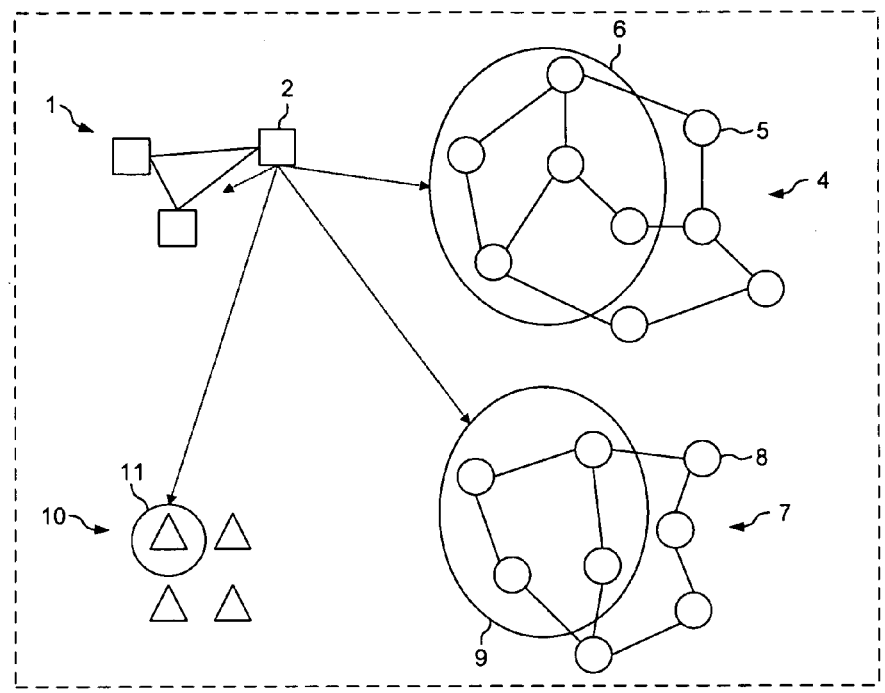
FIG. 1 is a schematic diagram of a system for extracting information from input data.

FIG. 1 is a schematic representation of a structure of a semantic cognition network according to an embodiment of the present invention. The semantic cognition network comprises four separate sub-networks: a processing network 1, a data object network 4, a class object network 7 and a set of algorithms 10. All objects contained in this semantic cognition network are semantic units.

The processing object network 1 comprises a plurality of processing objects 2. The data object network 4 comprises a plurality of data objects 5. A predetermined data domain 6 is chosen from among the plurality of data objects 5, depending upon the given situation as is described below. The class object network 7 comprises a plurality of class objects 8. A predetermined class domain 9 is chosen from among the plurality of class objects 8, depending upon the given situation as is described below. The set of algorithms 10 comprises a plurality of algorithms 11. A predetermined algorithm 11 is chosen from among the set of algorithms 10, depending upon the given situation as is described below.

Figure 2:
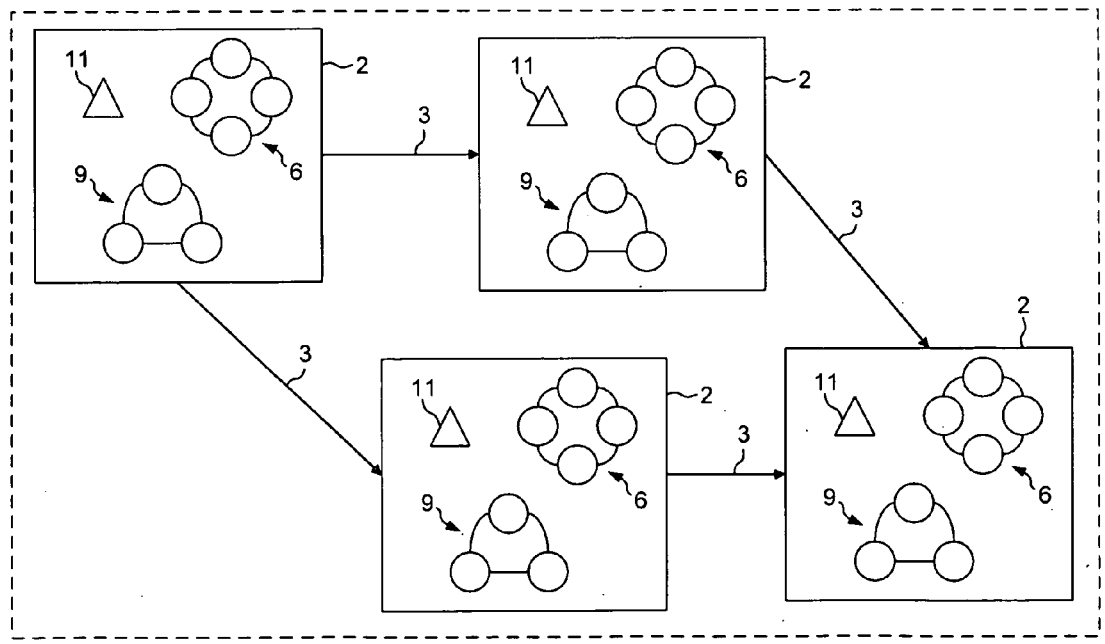
FIG. 2 is a diagram of a structure of domains and processing objects used by the system of FIG. 1.

FIG. 2 is a schematic representation of a structure of domains and processing objects 2. Each of processing objects 2 comprises a data domain 6, a class domain 9 and an algorithm 11. The various processing objects 2 are connected via linking objects 3 and together constitute a process network. The networking of the processing objects 2 via linking objects 3 defines an execution control. The execution control is a flow control for executing various processing objects 2. The execution control defines which processing object 2 is executed next after the execution of a previous processing object 2 is completed.

A processing object 2 is a object to perform an analysis operation, such as a picture analysis operation within a given project. As shown in FIG. 2, each processing object 2 comprises an algorithm 11, a data domain 6 and a class domain 9. The algorithm 11 defines what operation shall be performed. The data domain 6 defines where the operation is performed and which data object or data objects are processed by the algorithm 11. The class domain 9 defines under which criterion or criteria the operation is performed and which class or classes shall be used.

Due to the different domains and algorithms that can be selected depending on the given application, processing objects 2 can selectively act on predetermined data objects 5 and on predetermined class objects 8 by using a predetermined algorithm 11. For example, a predetermined segmentation algorithm is applied only to sub-data objects of a selected data object 5 within the data object network 4.

Figure 3:
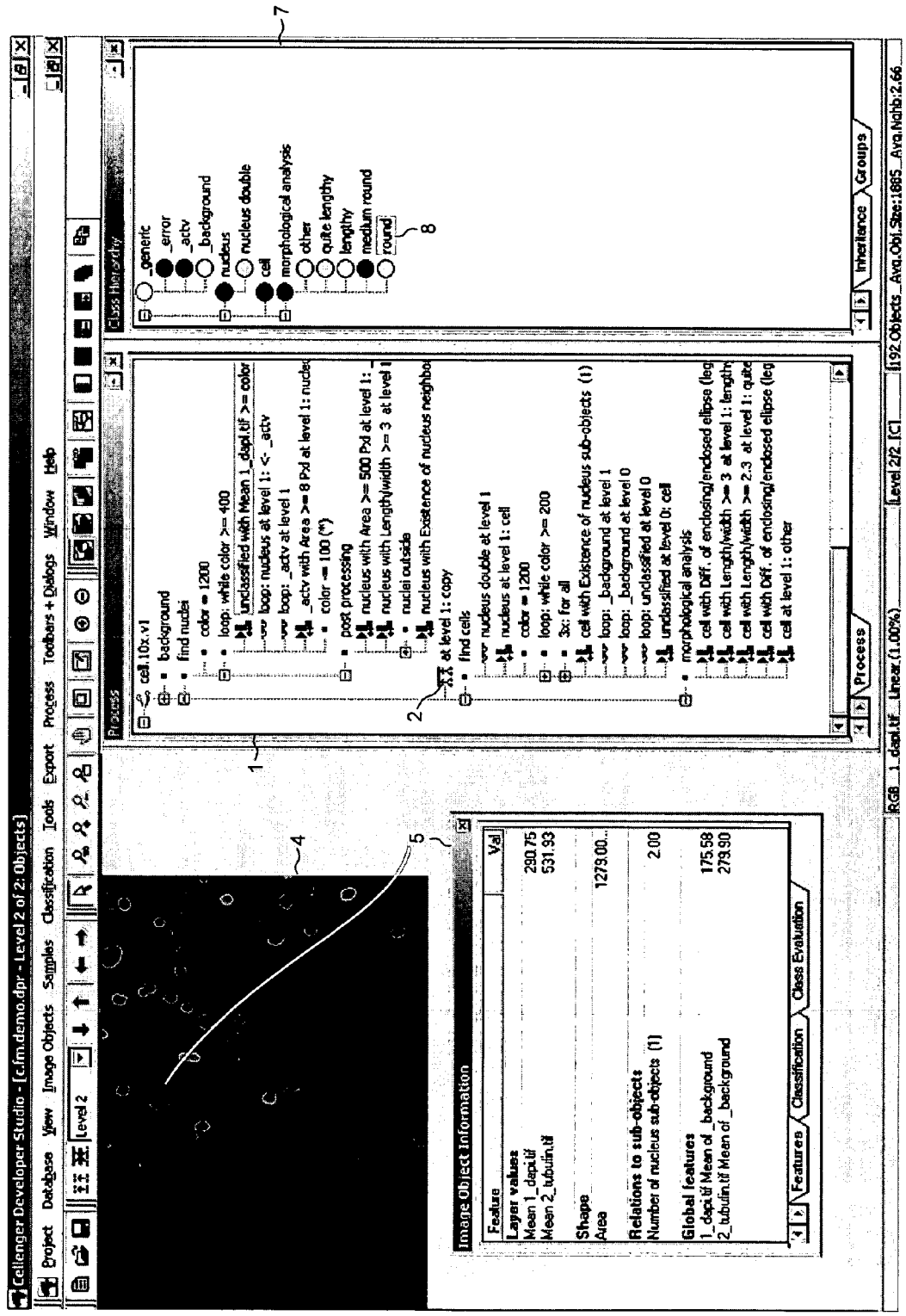
FIG. 3 is a screen shot of a graphical user interface of data objects, class objects and algorithm objects used by the system of FIG. 1.

FIG. 3 shows a screen shot of a graphical user interface of data objects 5, class objects 8 and algorithms 11. A user can select data objects 5, class objects 8, algorithms 11, and other settings to implement a desired application. Input data in the form of an image appears in the upper left window of the graphical user interface in FIG. 3. In the same upper left window, the data object network 4 comprising data objects 5 is displayed as an overlay. Individual data objects 5 can be selected and highlighted with an input device. Feature data of a selected data object 5 is displayed in the window labeled "Image Object Information".

Information relating to the processing object network 1 appears in the window with a tab labeled "Process". Such information includes processing objects 2 and related linking objects representing the execution control. Information relating to class object network 7 appears in the window labeled "Class Hierarchy". Such information includes the class objects 8 and related linking objects representing a semantic grouping of the class objects 8.

Figure 4:
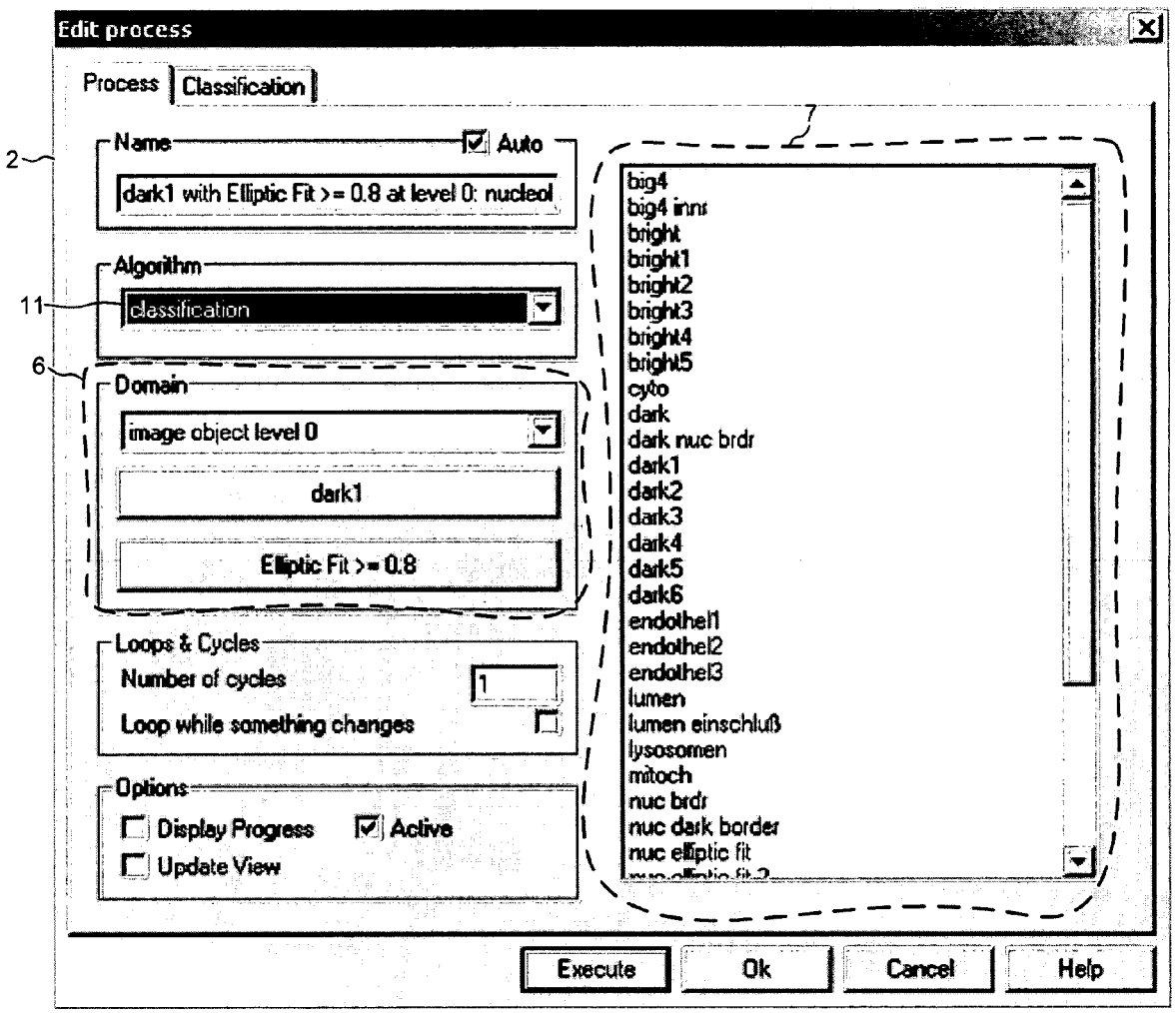
FIG. 4 is a screen shot representing a single processing object.

FIG. 4 is a screen shot representing a single processing object 2. The dialog element labeled "Algorithm" contains the selected algorithm 11 from the set of algorithms 10. An algorithm can be selected by the user from a drop list shown by an arrow button. The dialog element labeled "Domain" contains the description of the data domain 6 for the single processing object 2. The user can click an arrow button to select a data domain from a drop list. Data domains 6 are described by a structural subset of the data object network 4 as an additional classification condition labeled "dark1" and by an additional constraint labeled "Elliptic Fit>=0.8".

A dialog element labeled "Loops & Cycles" can be used to repeat the respective processing object 2 a certain number of times or until a stable state is reached. The large selection list on the right side shows all class objects 8 of the class object network 7. The user selects class objects 8 to specify the class domain 9.

Figure 5:
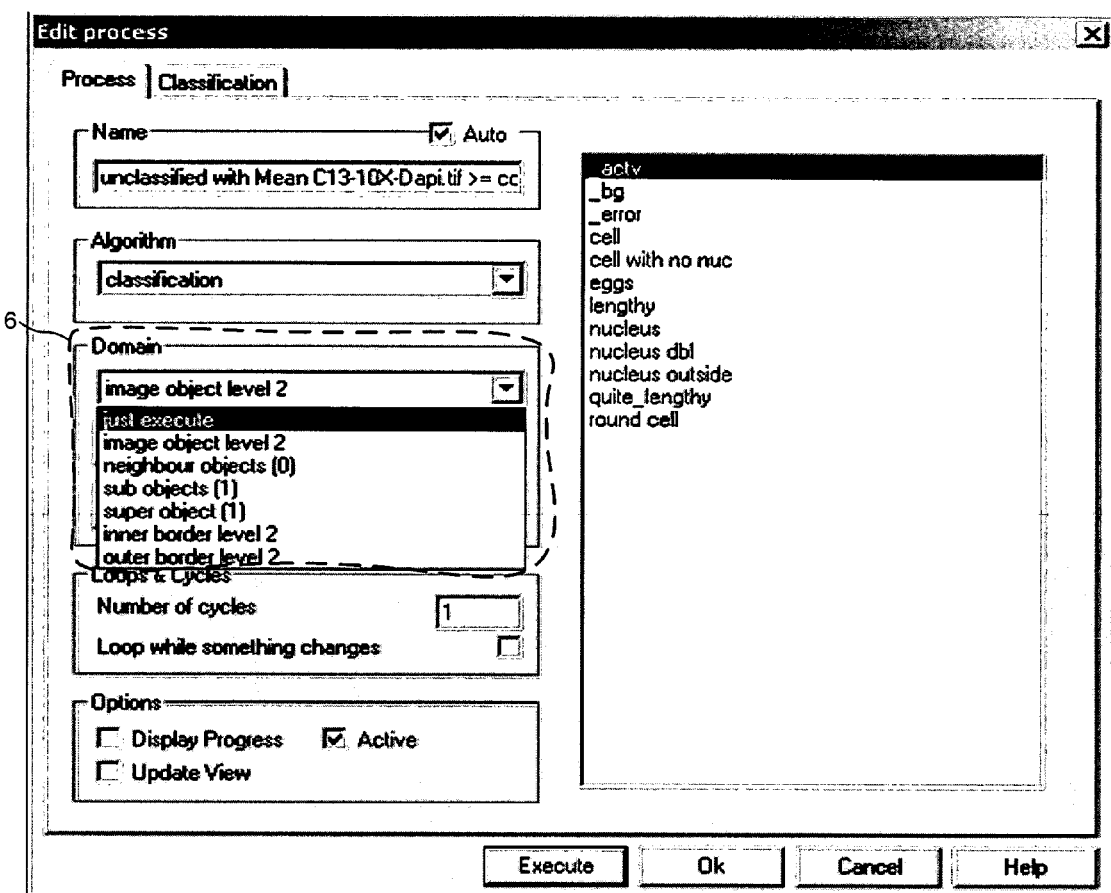
FIG. 5 is a screen shot representing a single processing object with a selection list of available data object domains.

FIG. 5 shows a single processing object with a selection list of available data object domains 6. In the dialog element labeled "Domain" there is shown the selection list of available data object domains 6 from which the user can select. The data domain 6 labeled "just execute" executes all linked sub-processing objects, preferably in series. Parallel execution, however, can also be implemented. The data domain 6 labeled "image object level 2" addresses all data objects 5 on a certain hierarchical level of data objects 5. The data domain 6 labeled "neighbor objects (0)" addresses all data objects 5 neighboring data object 5, which is being processed by a super-ordinate processing object. The data object 6 labeled "sub object (1)" addresses all data objects 5 that are sub-data objects to data object 5, which is being processed by a super-ordinate processing object. The data object 6 labeled "super object (1)" addresses a data object 5 that is a super-ordinate data object to the data object 5, which is being processed by a super-ordinate processing object. As shown in FIG. 5, additional data domains 6 exist and can be defined by the user.

Furthermore, there is also the possibility to navigate through the data object network 4 using different data domains 6 in linked processing objects 2. For example, firstly the data domain 6 labeled "image object level 2" is selected to address all data objects 5 on a certain hierarchical level of the data objects 5. Secondly the data domain 6 labeled "sub object (1)" is selected to address all data objects 5 that are sub-data objects to a data object 5 addressed before and being processed by a super-ordinate processing object. Thirdly the data domain 6 labeled "neighbour objects (0)" is selected to address all data objects 5 neighboring to the data object 5 being addressed before and processed by a super-ordinate processing object.

Figure 6:
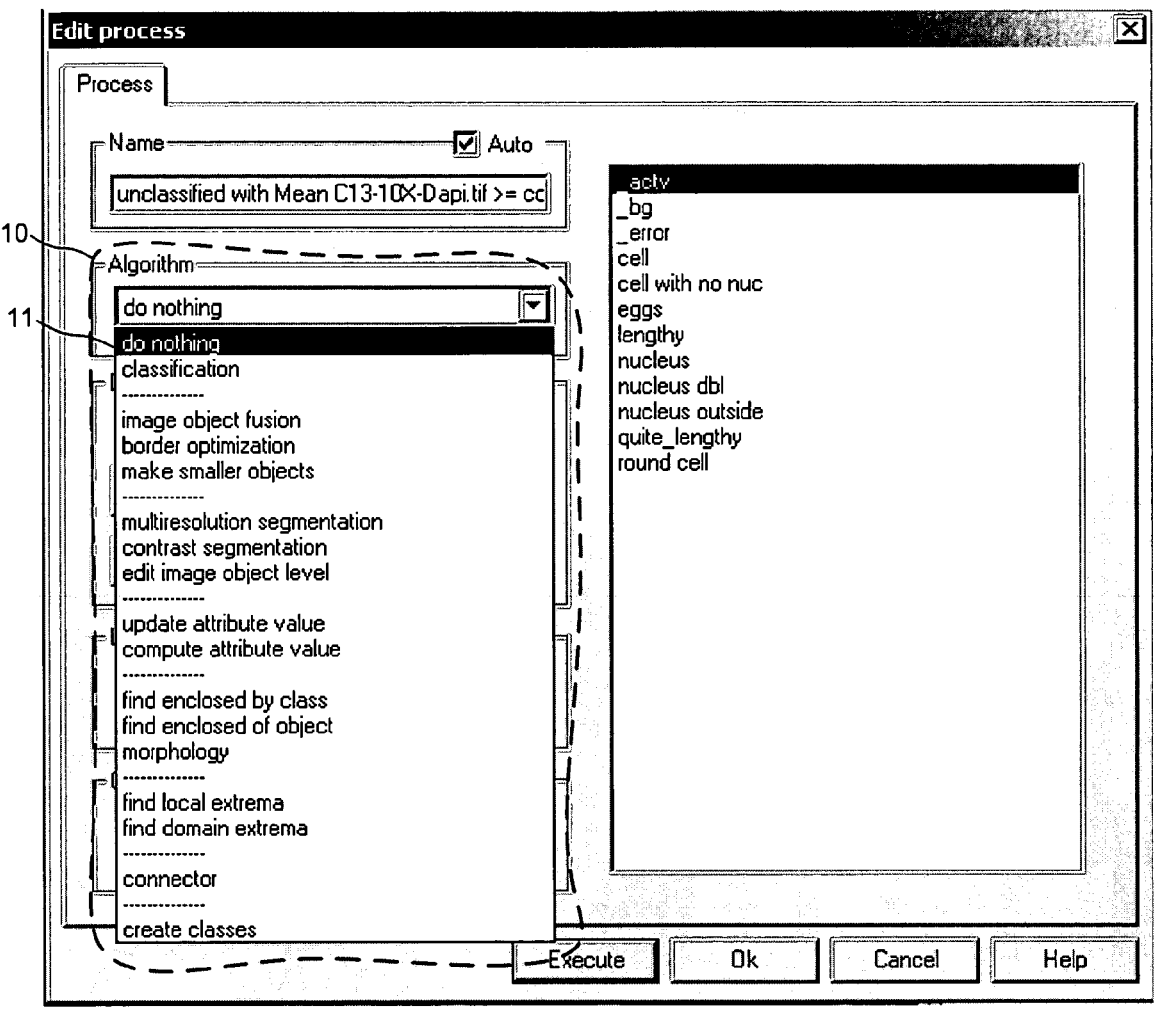
FIG. 6 is a screen shot of a single processing object with a selection list of an available set of algorithms.

FIG. 6 shows a single processing object with a selection list of an available set of algorithms 10. A selection list of available sets of algorithms 10 from which the user can select is shown in the dialog element labeled "Algorithm".

For example, the algorithm 11 labeled "do nothing" does not process data object 5 of the processing object 2 itself, but rather passes data object 5 to its sub-processing objects for further processing. The algorithm labeled "classification" classifies all data objects 5 in the given data domain 6 with the class objects 8 in the given class domain 9. The algorithm labeled "multi-resolution segmentation" creates an initial data object network based on the input data by optimizing a certain shape and color criterion. The algorithm labeled "update attribute values" updates attribute values that can be linked to any other object in the entire semantic cognition network. The algorithm labeled "create classes" creates new class objects 2 in the class object network 7 according to a certain criterion. As shown in FIG. 6, additional algorithms exist and can be defined by the user.

Figure 7:
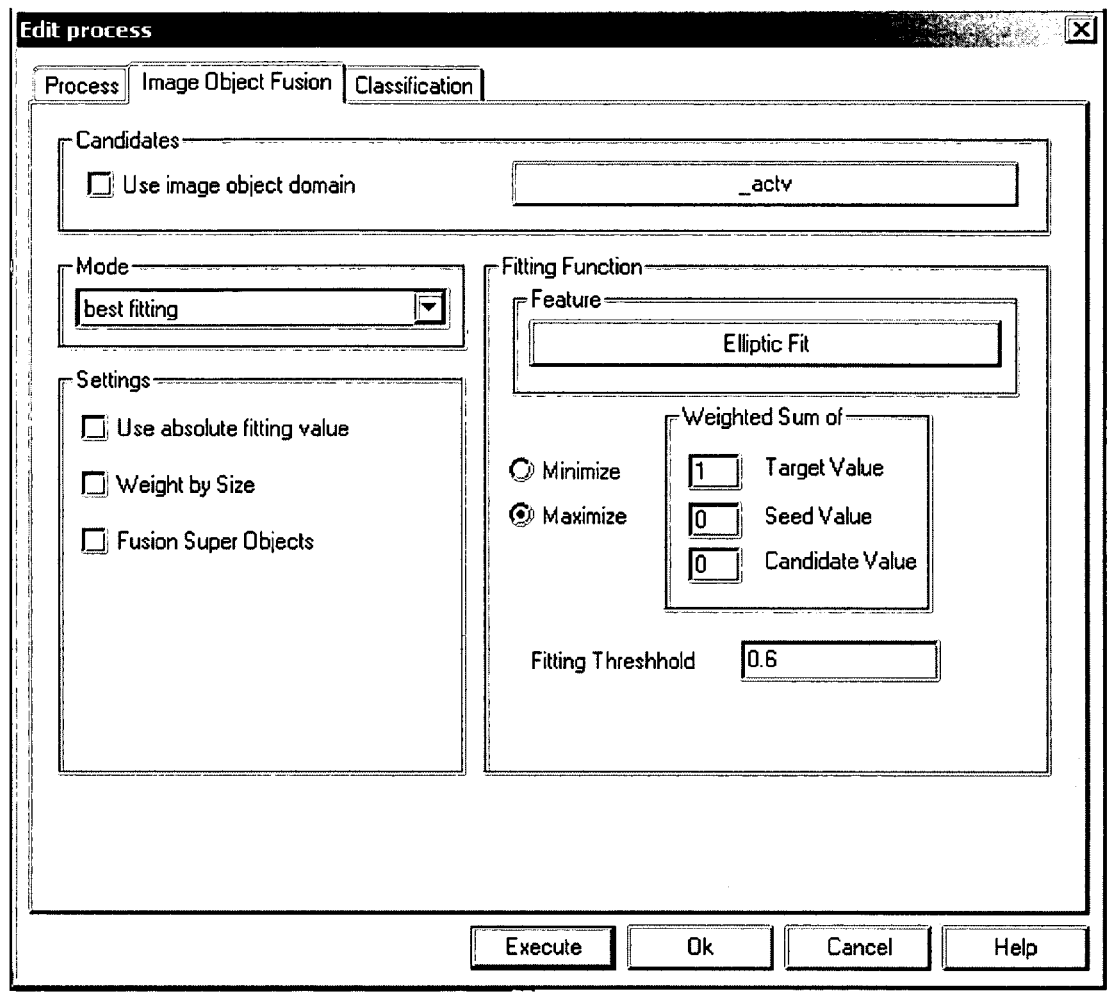
FIG. 7 is a screen shot of a parameter dialog for a special algorithm used by a single processing object.

FIG. 7 shows a parameter dialog for a special algorithm used by a single processing object. The parameter dialog shown serves for algorithm 11 labeled "image object fusion" shown in FIG. 6. Algorithm 11 labeled "image object fusion" merges two data objects 5 that are neighboring each other according to a certain criterion to obtain a further data object 5 consisting of the two data objects 5.

The dialog element labeled "Candidates" is used to specify the classification of the two neighboring data objects 5. The dialog element labeled "Fitting function" allows the user to define an optimization criterion composed of a data object feature such as here "Elliptic Fit" which measures a property of the two neighboring data objects 5 and a data object 5 generated by merging the two neighboring data 5 such as here the closeness to an ellipsis. However, any other property can also be used. Furthermore, the optimization criterion is also composed of a weighted sum of property values of the two neighboring data objects 5 and the data object 5 generated by merging the two neighboring data objects 5.

Radio buttons "Minimize" and "Maximize" are used to select whether the weighted sum of property values should be minimized or maximized. Finally, the resulting value weighted sum is compared with a fitting threshold which can also be selected by the user and is used to determine if the optimization is fulfilled or not.

If the optimization criterion is not fulfilled, the two neighboring data objects are not merged, and processing is completed. However, if the optimization criterion is fulfilled it is checked. For example, the optimization criterion is fulfilled if a mode for the fitting, such as "best fitting", which can also be selected by the user, is checked. If the mode for the fitting is fulfilled, the two neighboring data objects 5 are merged. However, if the mode of the fitting is not fulfilled, the process proceeds with one of the two neighboring data objects 5 and another data object 5 neighboring the one of the two neighboring data objects 5. The process mentioned above can be repeated until no further merging of data objects 5 occurs or until a certain number of cycles have been executed. The process mentioned above is an example of an important type of special processing objects, which is shown in FIG. 8 in a general manner.

Figure 8:
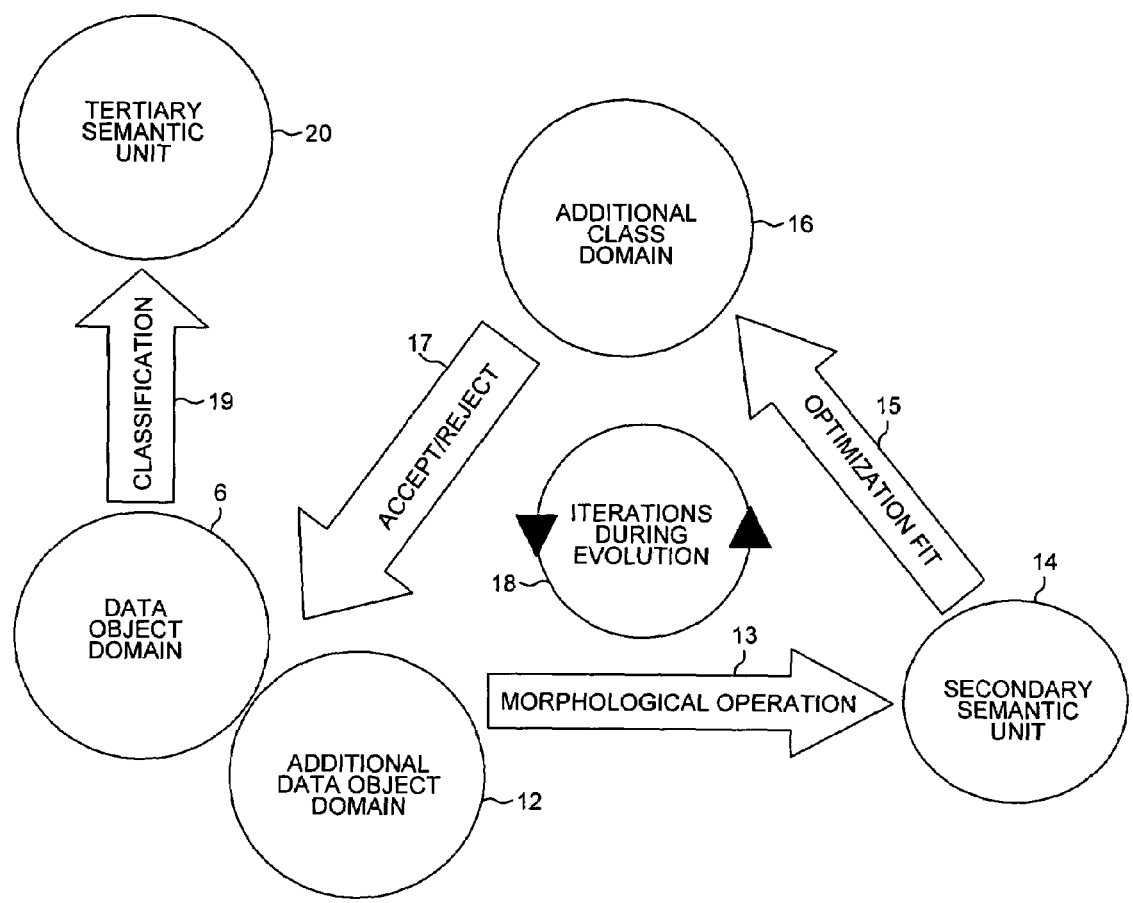
FIG. 8 is a diagram representing a classification-based object evolution performed in a triangle process.

FIG. 8 shows a classification-based object evolution performed in a triangle process. At the beginning of the triangle process a special processing object 2 is defined by selecting the data domain 6, the class domain 9, the algorithm 11, an additional data domain 12 in said data object network 4 and an additional class domain 16 in the class object network 7. The special processing network comprises the data domain 6, the class domain 9, the algorithm 11, the additional data domain 12 and the additional class domain 16.

Thereafter, a morphological operation 13 is performed using the algorithm 11 to combine the semantic units in the data domain 6 with the semantic units in the additional data domain 12 to create secondary semantic units 14. One of said secondary semantic units 14 is compared with a best-fitting one of the semantic units in the additional class domain 16 (see arrow 15) and said one secondary semantic unit 14 is accepted or rejected (see arrow 17) according to the fitting to thereby form a tertiary semantic unit 20.

Thereafter the aforementioned morphological operation 13 and the steps of comparing and accepting or rejecting (see arrow 17) are repeated until each tertiary semantic unit 20 is thereby removed from further processing. The aforementioned process can be performed such that each step is performed multiple times, as is shown by the circle 18 labeled "Iterations during evolution)". Furthermore, multiple special processing units can be linked together before the morphological operation is performed to form an execution control based on how the multiple processing objects are linked.

There is additionally the possibility to define super-ordinate special processing object by selecting a special data domain in a special processing object network, the class domain 9 in the class object network 7 and the algorithm 11 in the set of algorithms 10. The super-ordinate special processing object comprises the special data domain, the class domain 9 and the algorithm 11. The special processing is compared to the semantic units in the class domain 9. Finally, the special processing object is removed from further processing if the special processing object fulfills a predetermined criterion.

By means of the aforementioned additional process, there is the possibility to observe the behavior in time of each processed object and to use this behavior for classification and other processing of the observed objects.

As has been already mentioned above, the present invention can be applied to data objects in general. However, one important application of the present invention is the application on picture data to classify pictures. One specific application of the present invention is the application on picture data in the field of life science where the pictures are microscopic pictures taken from tissue samples, microscopic pictures taken from suitable stained tissue samples, microscopic pictures taken from living or fixed cells and microscopic pictures taken with fluorescent microscopes or scanners, etc. Another important application of the present invention is the application on picture data in the field of geographical information extraction using satellite, airborne or other pictures.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A computer-implemented method for extracting information from digital image data comprised of semantic units, comprising:

(a) defining a data object network by selecting a plurality of semantic units from said digital image data, wherein a semantic cognition network comprises said data object network, a class object network and a processing object network, wherein said class object network comprises categories of classifications of said selected semantic units, wherein said semantic cognition network is implemented on a distributed network of computers and uses a set of algorithms to process said selected semantic units;

(b) defining a processing object in said processing object network by selecting a data domain in said data object network, a class domain in said class object network and an algorithm from said set of algorithms, wherein said processing object comprises said data domain, said class domain and said algorithm; and (c) processing said selected semantic units in said processing object network using said processing object, wherein said processing said selected semantic units is used to display a picture region from the digital image data, and wherein the picture region includes semantic units from said data object network that fall within a classification of said class object network.

2. The method of claim 1, wherein said defining in step (b) is performed multiple times, and wherein each of said multiple times occurs in parallel.

3. The method of claim 2, further comprising, between step (b) and step (c):

(d) linking plural processing objects defined when step (b) is performed multiple times, wherein said plural processing objects are linked with each other to form an execution control based on said linking plural processing objects.

4. The method of claim 3, wherein said linking in step (d) comprises at least one of executing said plural processing objects as sub-processing objects, executing said plural processing objects in series or executing said plural processing objects in parallel.

5. The method of claim 1, wherein said processing object is executed several times, each time processing additional semantic units.

6. The method of claim 1, wherein said processing object network comprises a control structure taken from the group consisting of a loop, a branch, a function call, a jump and an execution control.

7. The method of claim 1, wherein said class object network and said processing object network are linked together via said class domain.

8. The method of claim 1, wherein said semantic cognition network uses classifying link objects to process said selected semantic units, and wherein said data object network and said class object network are linked together via said classifying link objects.

9. The method of claim 1, wherein said data object network and said processing object network are linked together via link objects that are dynamically generated during said processing in step (c) based on said data domain.

10. The method of claim 1, wherein one processing object is unambiguously defined by one data domain, one class domain and one algorithm.

11. The method of claim 1, wherein said processing using said processing object in step (c) comprises the steps of:

(c1) extracting a subset of data objects in said data domain from said data object network; and (c2) applying said algorithm to each of said data object in said subset of data objects.

12. The method of claim 1, wherein said data domain is a subset of said data object network, said class domain is a subset of said class object network, and said algorithm is a subset of said set of algorithms.

13. The method of claim 1, wherein a single processing object processes said selected semantic units in at least one of said data object network, said class object network and said processing object network based on said data domain, said class domain and said algorithm.

14. The method of claim 1, wherein said digital image data is obtained from microscopic pictures taken from tissue samples.

15. The method of claim 1, wherein said digital image data is obtained from a geographical satellite picture.

16. A computer-implemented system for extracting information from input data, comprising:

mapping means for mapping said input data into a data object network, wherein said input data comprises semantic units, wherein a semantic cognition network comprises said data object network, a class object network and a processing object network, wherein said class object network comprises categories of classifications of said semantic units, and wherein said semantic cognition network uses a set of algorithms to process said semantic units;

defining means for defining a processing object in said processing object network by selecting a data domain in said data object network, a class domain in said class object network and an algorithm from said set of algorithms, said processing object comprising said data domain, said class domain and said algorithm;

processing means for processing said semantic units in said processing object network using said processing object; and display means for displaying a picture region, wherein said picture region is generated using semantic units from said data object network that fall within a classification of said class object network.

17. The system of claim 16, wherein said defining means performs said defining several times, wherein a linking means links said processing object to a second processing object before said processing to form an execution control based on how said processing object is linked to said second processing object.

18. The system of claim 17, wherein said linking means links said processing object to said second processing object by executing said processing objects as sub-processing objects, by executing said processing objects in series or by executing said processing objects in parallel.

19. The system of claim 16, wherein said processing means executes said processing object multiple times.

20. The system of claim 16, wherein said processing object network comprises a control structure taken from the group consisting of a loop, a branch, a function call, a jump and an execution control.

21. The system of claim 16, wherein said class object network and said processing object network are linked together via said class domain.

22. The system of claim 16, wherein said semantic cognition network uses classifying link objects to process said semantic units, and wherein said data object network and said class object network are linked together via said classifying link objects.

23. The system of claim 16, wherein said data object network and said processing object network are linked together via link objects that are dynamically generated based on said data domain.

24. The system of claim 16, wherein one processing object is unambiguously defined by one data domain, one class domain and one algorithm.

25. The system of claim 16, wherein said processing means extracts a subset of data objects in said data domain from said data object network and applies said algorithm to each of said data object in said subset of data objects.

26. The system of claim 16, wherein said data domain is a subset of said data object network, said class domain is a subset of said class object network, and said algorithm is a subset of said set of algorithms.

27. The system of claim 16, wherein a single processing object processes said semantic units in at least one of said data object network, said class object network and said processing object network based on said data domain, said class domain and said algorithm.

28. A system implemented on a computer for extracting knowledge comprising:
  a data object network;
  a class object network, wherein semantic units are networked to each other in each of said data object network and said class unit network, wherein said semantic units comprise digital image data;
  defining means for defining a processing unit by selecting a data domain in said data object network, a class domain in said class object network and an algorithm from a set of algorithms, each of which being part of said processing unit;
  processing means for processing said semantic units in accordance with said data domain, said class domain and said algorithm; and
  display means for displaying a picture region, wherein said picture region is generated using semantic units processed in accordance with said data domain.

29. A computer-implemented system for extracting information from digital image data, comprising:
  a data object network having a data domain, said data object network receiving said digital image data;
  a class object network having a class domain;
  a processing object network having a processing object, wherein a semantic cognition network comprises said data object network, said class object network and said processing object network, wherein said semantic cognition network uses a set of algorithms to process said digital image data, wherein said processing object comprises said data domain, said class domain and an algorithm from said set of algorithms wherein said processing object network processes said semantic units using said processing object; and
  a display on which a region of a digital image is marked to show part of said digital image data that comprises said semantic units processed using said processing object.

30. The system of claim 29, wherein said processing object network comprises a control structure taken from the group consisting of a loop, a branch, a function call, a jump and an execution control.

31. The system of claim 29, wherein said digital image data is obtained from microscopic pictures taken from tissue samples.

32. The system of claim 29, wherein said digital image data is obtained from a geographical satellite picture.

* * * * *